United States Patent [19]

Sandor

[11] 4,226,175

[45] Oct. 7, 1980

[54] APPARATUS FOR MAKING HOT BEVERAGES

[76] Inventor: Steven D. Sandor, 19 Woodmount Crescent, Ottawa, Canada, K2E 5P9

[21] Appl. No.: 7,517

[22] Filed: Jan. 29, 1979

Related U.S. Application Data

[62] Division of Ser. No. 869,217, Jan. 14, 1978.

[51] Int. Cl.³ .............................................. A47J 31/42
[52] U.S. Cl. ........................................ 99/286; 99/287
[58] Field of Search ................ 99/286, 287, 288, 279, 99/300, 307

[56] References Cited

U.S. PATENT DOCUMENTS

| | | | |
|---|---|---|---|
| 399,803 | 3/1889 | Wagner | 99/286 |
| 1,063,188 | 6/1913 | Simone | 99/286 |
| 1,189,035 | 6/1916 | Asbury | 99/286 |
| 1,345,477 | 7/1920 | Cappelli | 99/286 |
| 1,604,058 | 10/1926 | Mager | 99/286 |
| 2,154,963 | 4/1939 | Swager | 99/286 |
| 2,325,683 | 8/1943 | Kayden | 99/286 |
| 2,325,684 | 8/1943 | Kayden | 99/286 |
| 2,906,193 | 9/1959 | McCauley | 99/286 |
| 3,107,600 | 10/1963 | Buisson | 99/286 |
| 3,153,377 | 10/1964 | Bosak | 99/286 |
| 4,074,621 | 2/1978 | Cailliot | 99/286 |

FOREIGN PATENT DOCUMENTS 209665  1/1924  United Kingdom ...................... 99/286

*Primary Examiner*—Robert W. Jenkins
*Attorney, Agent, or Firm*—Zalkind & Shuster

[57] ABSTRACT

Even if freshly roasted and freshly ground coffee is used when percolating hot coffee, much or at least part of the fragrances and aromas originally contained in the coffee beans disappear into the environment instead of staying with the brew, therefore, in order to save these aromas and fragrances, a method and an apparatus is suggested with the help of which roasting and grinding of the coffee beans take place inside the flask where the beverage gathers, thus assuring that all or most of the aromas and fragrances generated during roasting and grinding stay contained in the flask until the coffee is served.

17 Claims, 5 Drawing Figures

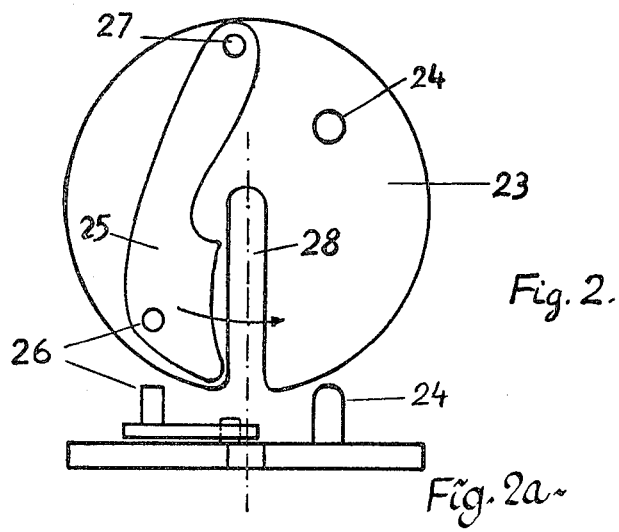
Fig. 2.
Fig. 2a.
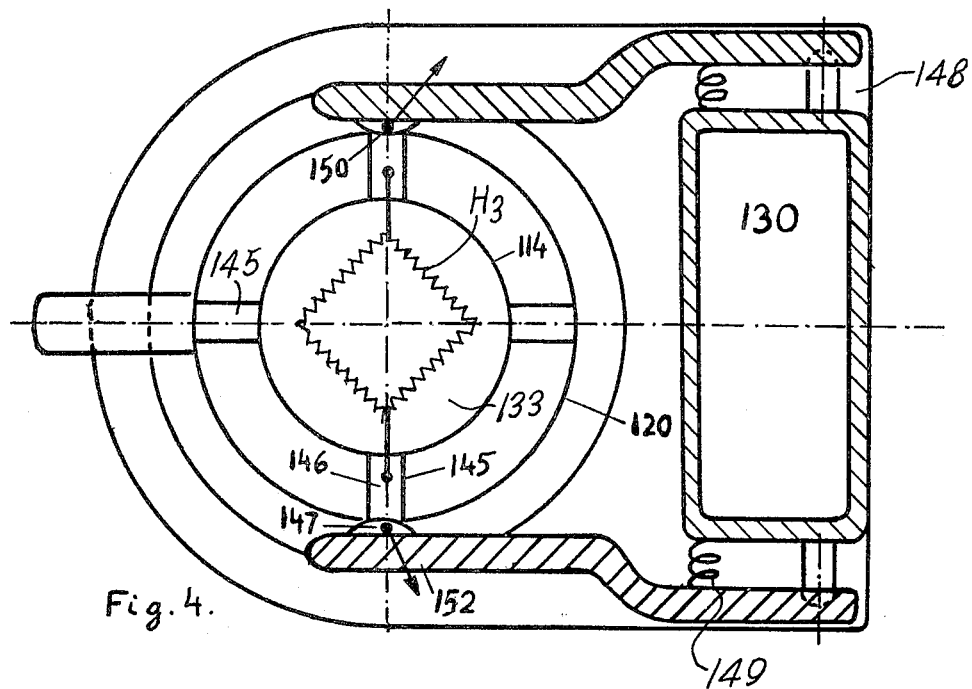
Fig. 4.

APPARATUS FOR MAKING HOT BEVERAGES

This application is a division of applicant's previously filed application Ser. No. 869,217, filed Jan. 14, 1978.

BACKGROUND OF THE INVENTION

(Problems)

A good cup of coffee is best achieved when freshly roasted coffe beans have been ground, and the freshly ground coffee is percolated properly. "Good" coffee is not only good tasting but also flavourful. By this I mean that it should contain as much of the enticing volatile aromas and fragrances of coffe as possible. Some of these fragrances appeal to the coffee-drinkers' sense of smell, while other aromas contribute to the taste.

As can be seen, in this disclosure "aromas" and "fragrances" are used somewhat alternately. I use "aromas" as substances rather diluted in the liquid, and "fragrances" as rather a vapour or gaseous substances, but this is a matter of degree: some parts of the aromas may evaporate at a certain stage, and some parts of the fragrances may enter the liquid.

A part of the enticing fragrances contained in the coffee beans disappear into the environment during and immediately after the process of roasting. Additional fragrances are released and lost when grinding opens up the inside of the coffee beans. Since the coffee is roasted and ground separately and apart from the brewer, some of the originally present flavours and aromas evaporate instead of getting into the brew or at least staying in the air surrounding the cup of coffee.

OBJECT OF THE INVENTION

(Solution)

It is the object of this invention to save enticing fragrances and aromas of the coffee which otherwise, by the presently used methods, escape during roasting, grindig or brewing. This object is achieved by roasting and grinding the coffee practically at the same time, in the same container (basket), and further, as an additional means of improvement, by the fact that the roasted and ground coffee may stay inside the percolator so that the hot water and/or steam passes through the basket where the green coffee beans have been just roasted and ground, without leaving much time and opportunity for the fragrances and aromas to leave the coffee-making unit in the interval before the coffee is brewed. Even if some, or the greater part of these fragrances and aromas elope, they, at least, stay in the air surrounding the coffee.

Thus, one of the main features of the invention is the basket containing the coffee beans, and this basket having inside a blade means, e.g., one or more rotatable blades, where the task of the blade(s) consists of stirring the green coffee or other substance in the basket during roasting, and to grind the lumpy substance.

MORE DETAILED DESCRIPTION OF THE INVENTION

The invention may be carried into practice in a number of ways, especially since coffee can be brewed in different ways (e.g. drip, vacuum, percolated) and other hot beverages (e.g. soups) show a very wide variety. Some specific embodiments of the invention will now be described by way of examples, with reference to the accompanying drawings, wherein similar reference characters designate similar parts throughout. Sizes and shapes in the drawings are merely illustrative of one or more possible embodiments, and not restrictive of the present inventive concept. In short: the invention is illustrated by, but not limited to the following examples.

BRIEF DESCRIPTION OF THE DRAWINGS

FIGS. 2 and 2a show in plan the perforated cover of the coffee container.

FIG. 2a shows a side view of the cover.

FIG. 4 shows a horizontal section on B—B of FIG. 3, as an example how the current may be fed into the electric heating plate.

MORE DETAILED DESCRIPTION OF SOME PREFERRED EMBODIMENTS

Figure 1:
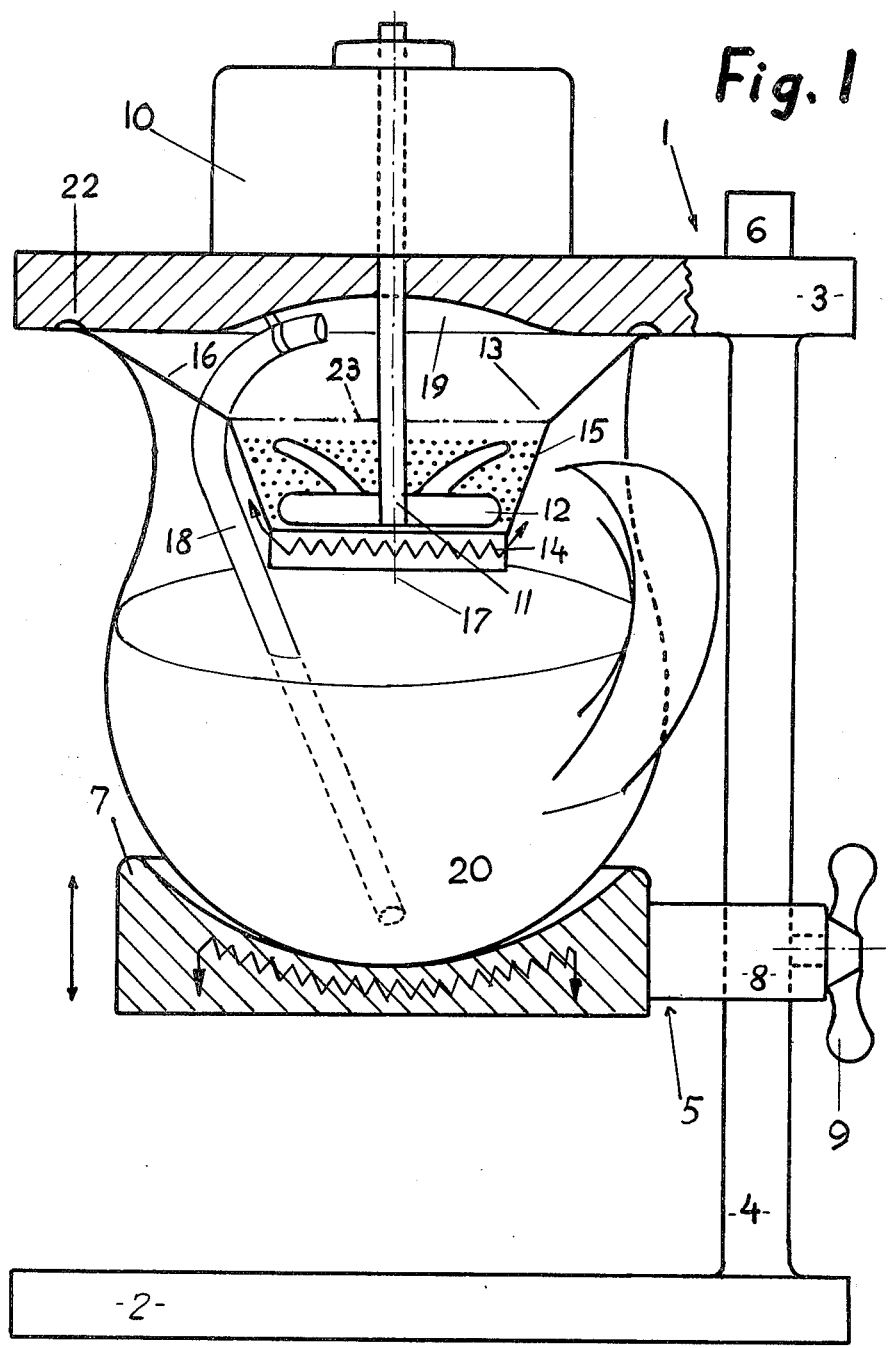
FIG. 1 is a side view (partially broken away) of a coffe maker.

In FIG. 1 reference numeral (1) denotes a stand of a coffee making unit which works with the so called "pump", well known, for instance, from the pyrex® percolator. This stand (1) consists of a base (2), a shelf, top, or roof (3), and a column (4), which latter connects (2) and (3). The column must be strong enough to firmly support on its lower part the slide (5) which is slidably fixed on column (4), and, on its upper part, to support the electromotor (10) on top of the roof.

Slide (5) consists of three main parts, namely of heating platform (7), or shelf having heating coil $H_1$ glider (8) and wing screw (9).

The shaft (11) of electromotor (10) goes through top (3) and protrudes comparatively deeply down into the area between the top (3) and heating plate (14). To the lower end of the shaft is secured blade (12) which thus revolves together with the shaft. Blade (12) is surrounded by basket (13). Under the basket is heating plate (14) having heating coil $H_2$; perforated side-wall (15), and suspension elements (16) complete this immediate environment. The basket which has as its bottom heating plate (14) and its side-wall (15) is frusto-conical in FIG. 1 but may take some other shape, and may be covered after coffee is brewed with the perforated cover (23) shown in FIG. 2 in more detail, indicated by the phantom line in FIG. 1. The top has a handle (24) for easy gripping and handling. The perforated latch (25), with the help of lug (26) is turned in the direction of the arrow around rivet (27) to close the gap (28) after the basket has been filled with green coffee beans. The task of the top is to keep the coffee within the basket during roasting and grinding.

In operation, this coffee maker works as follows:

The flask (20) is filled with cold or with preheated water, up to a marked level. The mark on the flask is set to a height ensuring that the basket with its lowest part, the heating plate (14) should never touch the water level. The basket is hanging down into the air space of the flask and is kept in place with the help of suspension elements (16). The basket is filled with green coffee beans, or with pre-roasted (not fully roasted) coffee beans. After the flask has been filled with water and the basket with the necessary amount of green coffee (the exact ratio of water and coffee beans is chosen according to individual taste, as in other coffee brewing methods). The flask (with the basket inside) is put on the heating platform (7), and the whole slide (5) is lifted from the base to its high position, as seen on the drawing.

The axis (17) of the basket (13) and of the blade coincide in this case. In order to further facilitate the proper positioning of the flask, a circular groove (22) has been milled into the lower face of top (3). The new, high position of the flask is ensured by tightening the wing-screw (9) on the column. In order to keep the drawing free from many distracting lines, the electrical wiring of the apparatus is not shown. Suffice to mention to the man knowledgeable in the art that platform (7), heating plate (14) and motor (10) are supplied with electric current, governed by timers (6).

After the basket is filled with green (or partly roasted) coffee beans and the flask is firmly in the position shown on the drawing, heating plate (14) is switched on, i.e. the roasting of the beans is started. At the same time the electromotor is switched on so that the blade starts to slowly revolve. Thus the coffee beans are stirred slowly. When the coffee is properly roasted, heating plate (14) is switched off and the motor is switched over to a fast, high revolution, on account of which the roasted coffee will be ground. In both cases, but especially in the latter, high speed setting, the blade works in a way which is somewhat similar to the operation of a blade in the well known blenders. It should be mentioned, however, that the slow, stirring revolution is slower than the minimum revolution in ordinary blenders.

While the grinding is in process, the heating on platform (7) may be switched on so that by the time the coffee is properly ground, the water in the flask becomes hot and starts boiling so that the steam above the water presses hot water through pump (18) above the coffee basket. The hot water is directed to the cupola (19) hollow in the bottom surface of the shelf (3), from where it drips down into the basket, and from the basket, through its perforated side wall (15) into the flask. The whole procedure continues until the drink in the flask reaches the desired rich brown colour and becomes a flavourful coffee. As could be seen from the above description, my method and apparatus ensures that the fragrances and aromas discharged during roasting and grinding will not be vasted. At least some of the ingredients which are lost with the currently applied coffee-making methods will be saved and enjoyed.

It should be mentioned here that by pre-roasting, undesireable flavours and fragrances can be eliminated from the coffee before the roasting procedure. Also, de-caffeinated drinks may be made.

Figure 3:
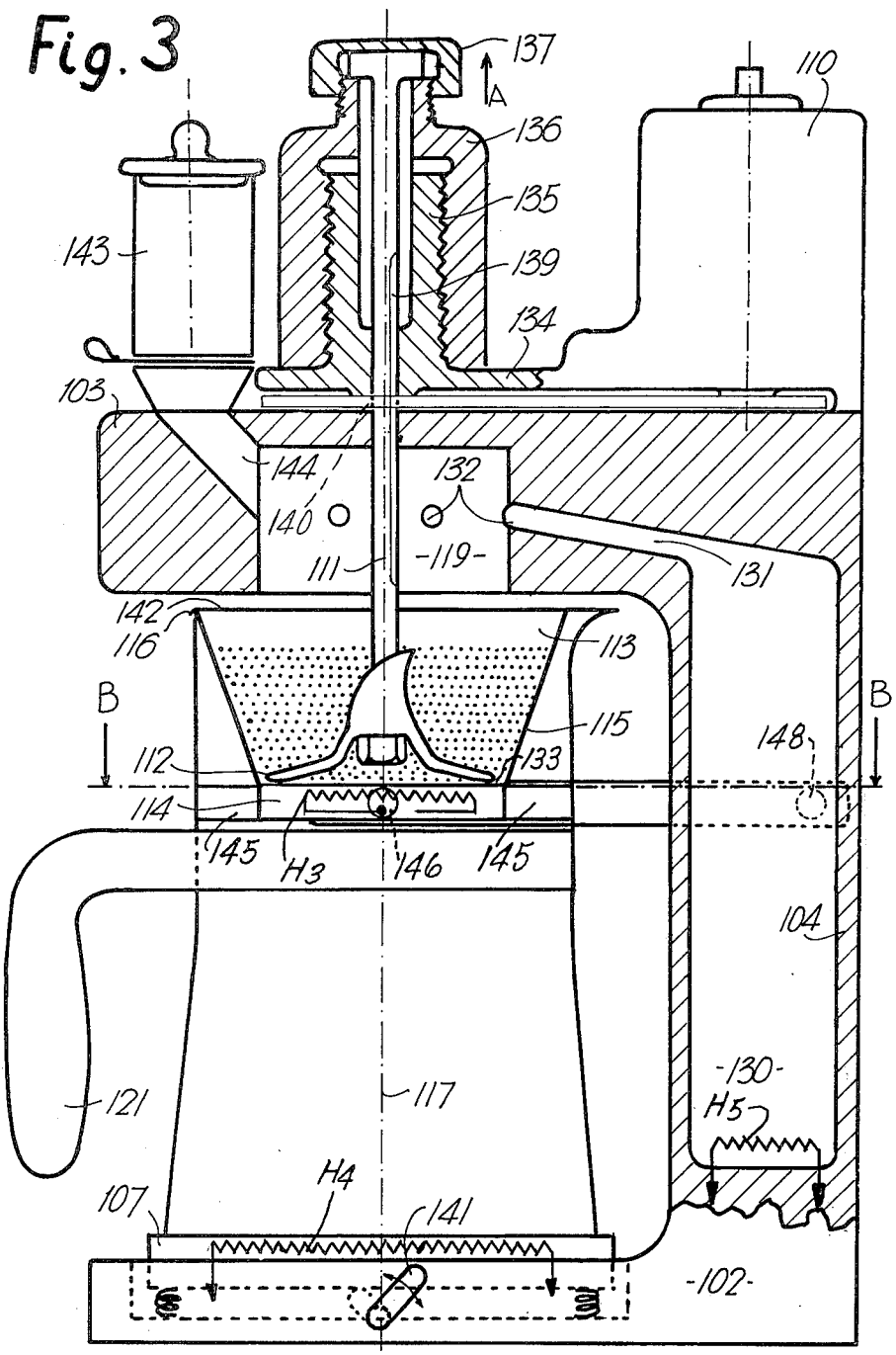
FIG. 3 represents a side view (partially broken away) of a "drip type" coffee maker.

With the design according to FIG. 3 the pump (18), shown inside the flask in FIG. 1 can be dispensed with. A base 102 has a hollow column (104), serving as a water reservoir (130). The base has heating coil H4. The water in this reservoir is heated with the help of an electrical coil H5. In order to keep the drawings simple and easy to follow, no attempt is made to show electric wiring, switches, etc. which can be designed by the man knowledgeable in the art. Timers (indicated at 6 in FIG. 1), automatic (more or less programmed) switches etc. are not needed in detail in the drawings for the understanding of the invention, the gist of which residing in the unique combination of the basket with the blade(s) having at least one slow (stirring) revolution and at least one fast (grinding) revolution, the bottom of the basket being heated and, as an additional feature, the whole before mentioned device being surrounded completely or at least mainly by the brewing equipment as a complete and more or less closed unit.

According to FIG. 3, the basic idea of this invention can be very well applied to the requirements of the so called "drip" type coffee maker. The inside of column (104), i.e. the water reservoir (130) is heated electrically or by any other means (e.g. with natural gas in larger, restaurant type coffee makers) and the hot water or steam is led through hole or outlets (132) into the cupola (119), from where it drips down into the basket (113). Under the basket there is a heating plate (114), having heating coil H3 but the substance in the basket to be roasted may be heated otherwise, e.g. by micro-wave. In the latter case, the bottom of the basket may have the maximum perforations; in case the roasting is effected by an electric coil, only a limited number of perforations can be provided. It goes without saying that only the upper surface (133) of the electrically heated plate (114) need be hot. By keeping the other surfaces of the basket comparatively cooler, a paper filter may be added to the basket, especially in case of micro-wave heating.

On top of the shelf (103) is electromotor (110) which turns shaft (111) and blade (112) through a V-belt drive. Of course, shaft (111) may be driven by a chain drive, by gears, or by any other means; even direct drive may be used as long as the electro-motor is able to produce the slow revolution for stirring the contents of the basket, and the fast revolution needed for grinding. Shaft (111) has a groove (139) into which intrudes a key connecting the shaft with wheel (140), thus ensuring a positive drive connection between the wheel and the motor and at the same time enabling the up and down movement of the shaft. Moving the shaft up, and moving up with it the blade, the cleaning of the basket and of the blade will become much easier. Also, it will be easier to slip the flat-bottomed flask (120) in and out of position.

While in general no details of the electrical equipment are given, nevertheless one way of supplying the heating plate (114) with electric current will be now described as an example of several possible solutions. As can be seen in FIG. 4, heating plate (114) is firmly attached to the wall of the flask (120) by several bridges such as (145). Through two of these bridges electrical conductor rods (146) are led to the outside surface of the flask from a heating element in the heating plate. The ends (150) of these conducting rods (146) are concave and match with convex contacts (147) of the arms (152). These arms are pivotally connected with column (104) at pivot pins (148). Springs (149) ensure that the contact between (146) and (147) be always firm, and that at the same time when no contact is needed, the flask be removable. It should be mentioned here that, in order to simplify the construction, one of the arms (152) may be rigidly fixed on the column and only the other arm need be flexibly mounted. The housing of motor 110 extends as a shelf 134 having upstanding bolt 135 which carries a nut member 136.

The apparatus outlined in FIGS. 3 and 4 is used the following way:

Nut (136) is turned by hand so that it moves in the direction of arrow (A), together with cap (137), thus lifting the shaft (111) and blade (112). This way the blade is withdrawn into cupola (119) and the flask may be pulled out easily from under the roof (103). The flask (and the basket inside the flask) thus having been freed, it is easy to clean the basket, and fill the basket with green or partly roasted substances, e.g. coffee beans.

Then the flask will be put back on the keep-warm platform ((107), and blade (112) lowered. At the same time the current in the heating pad (114) is switched on and the roasting phase has started, while the blade rotates slowly, thereby ensuring that the contents of the basket will be roasted uniformly. When the roasting is finished, the current in the heating pad is switched off and the blade starts to rotate fast in order to grind the fresh roasted particles. The water in the reservoir is brought to boiling in the meantime, hot water and/or steam is leaving the reservoir through channel (131 and outlets (132) into the cupola and from there into the basket. The hot water or steam seeps through the basket and flavourful, aromatic, fresh brewed coffe fills the flask. The blade may be switched on again for slow movement to stir the ground coffee (or other substance) in the basket. This way the ground coffee will be utilized more thoroughly and uniformly.

If not the full amount of coffee is served immediately, the remaining part can be kept warm in the flask with the help of keep-warm platform (107) which may be switched on and off manually. The other switches generally work with pre-set timers, and in bigger, restaurant-size coffee makers can be completely pre-programmed.

Keep warm platform (107) can be lifted and lowered with the help of of lever arm (141). This is helpful in taking out the flask after the coffee making process is finished, and also, with different setting of the lever arm one can set the gap between the upper rim (142) of the flask and the lower end surface of the top (103). In other words, the lever arm sets the amount of steam and fragrances which may leave the flask before the drink is served.

Sometimes the brewer wants to make the drink from two or more different kinds ingredients which require different roastings. Since coffee prices are high, some people wish to mix coffe with chickory, for instance. Whichever ingredient requires longer roasting, it will be fed into the basket first. Later the other ingredient (requiring a shorter time for roasting) will be fed into basket from container (143) through chute (144) so that the roasting of the two ingredients should be finished at the same time.

It should be noted at this point that the above mentioned sequence of steps may be changed. For instance, a slightly pre-roasted coffe may be ground roughly first, and roasted only afterwards, then it may be ground again, this time to extremely fine particles. In an other example, making onion soup, an onion is roughly ground first and the coarsly chopped onion will be roasted afterwards. The dripping of water may be started while the onion chops are roasted.

While it is simpler to use the same blade for the (slower) stirring by the variable speed drive means, motor 10, and for the (faster) grinding step, there may be situations where more than one blade can be used. In the latter case the unused blade(s) may be withdrawn into the cupola while the suitable blade is working in the basket.

By the term blade (12), as can be seen in FIG. 1, for instance, one should not necessarily understand a practically two-dimensional, straight knife blade. A three-dimensional wing like blade, or any other suitable shape may be employed, for example a so called spin blade, as used in the OSTERIZER ®. Osterizer is the trade mark of the liquifier-blender manufactured by the John Oster Mfg. Co., Milwaukie, Wisconsin. However, not only the shape of a blade applied in this invention, but also the material from which it is made should not be necessarily the same as used in the Osterizers. Thus, instead of metal, ceramics or other suitable materials may be used.

When terms "up", "down", "on top", "below", etc. are used herein, it should be understood that these terms have reference only to the structure shown in the drawings as it would appear to a person viewing the drawings and are utilized only to facilitate explaining the invention.

It should be emphasized that many modifications in the presently preferred embodiments will occur to those skilled in the art. Accordingly, the scope of the invention is not limited to the illustrative examples mentioned above.

I claim:

1. An apparatus for making beverages from a commodity to be processed therein, comprising a pervious container (15, 115) having motivated blade means (12, 112) in said pervious container operable at selective speeds for respective roasting, grinding and stirring phases of a commodity in said pervious container;

heating means ($H_2$ $H_3$) operable to heat a commodity for roasting thereof in said pervious container;

flow means for effecting passage of a heated fluid into said pervious container to permeate through a commodity ground therein to produce a beverage flow into a flask;

whereby a commodity may be heated and roasted at a preselected low blade means speed and ground at a preselected high blade means speed and subjected to flow of hot fluid therethrough while being stirred at a preselected low blade means speed to produce a beverage flow into a flask from said pervious container.

2. An apparatus as set forth in claim 1, including timer means (6) for predetermined sequence control of operation of said heater and blade means speeds.

3. An apparatus as set forth in claim 1, including a variable speed motor for operation of said blade means and control means for selective speed operation.

4. An apparatus as set forth in claim 1, including a flask wherein said pervious container is disposed within said flask;

support means for said blade means comprising a shelf carrying said blade means and being operable to effect an aroma sealing enclosure for said flask; said pervious container being carried by said flask.

5. An apparatus as set forth in claim 1, including a flask and drive means for said blade means;

support means for said flask, said drive means, and said blade means; said support means comprising a base having a warming platform for support of said flask and comprising a shelf for support of said blade means in said pervious container.

6. An apparatus as set forth in claim 1, including a variable speed drive means for operation of said blade means and control means for said drive means to effect speed variation.

7. An apparatus as set forth in claim 6, including a flask and a support means;

said heating means being electrical and disposed to transmit heat to said pervious container and said heating means being secured within said flask; including means for removably carrying said flask on said support means and means for conducting electric current to said flask;

said latter means comprising an upright column of said support means having a pair of spaced arms secured thereto for straddling said flask and having electric contacts;

said flask having conductive means connected to said heating means and being engageable by said electric contacts and disengageable therefrom.

8. An apparatus as set forth in claim 6, including a support means for said blade means comprising a base and an upright column extending therefrom with a shelf extending from said upright column carrying said blade means;

means for carrying a flask comprising a warming member and adjusting means whereby said warming member is vertically adjustable to position a flask thereon into a sealing coaction with said shelf.

9. An apparatus as set forth in claim 6, including a flask, a support means comprising a shelf carrying said drive means; said pervious container being disposed within said flask; and means whereby said shelf effects an aroma sealing enclosure for said flask.

10. An apparatus as set forth in claim 9, wherein said flask has an open top edge and said pervious container has a flange resting thereon wherein said flange is intermediate said open top edge and said shelf to effect said sealing coaction.

11. An apparatus as set forth in claim 6, including a support means for said pervious container comprising a base having an upstanding column with a hollow interior for containing water to be heated therein;

said flow means comprising a passage from said hollow interior leading to said pervious container.

12. An apparatus as set forth in claim 6, and support means comprising a platform for carrying said flask and said platform having means to said fluid in said flask for flow into said flow means to said pervious container.

13. An apparatus as set forth in claim 6, wherein said first mentioned heating means is disposed below said pervious container for heat conduction thereto.

14. An apparatus as set forth in claim 6, including a support means for said blade means comprising a shelf;

said drive means comprising a variable speed motor carried by said shelf and having a shaft extending therethrough;

said blade means comprising a grinding blade carried on said shaft and within said pervious container.

15. An apparatus as set forth in claim 6, said drive means comprising a variable speed motor and support means therefore comprising a shelf and said motor having a shaft extending therethrough;

said blade means being carried on said shaft within said pervious container;

said shelf having an undersurface provided with a hollow portion; and means for shifting said blade means at least partially into said hollow portion of said shelf to selectively use less than the entire blade means in operation thereof.

16. An apparatus as set forth in claim 6, including a flask; said pervious container being disposed in said flask; and means for sealing said flask with said pervious container therein to retain aroma during operation of said apparatus.

17. A food processing apparatus comprising a horizontal base, a vertical column standing on the base and a shelf supported thereon;

a platform on said base and a flask carried on said platform below said shelf and slightly shorter than said column and having an open top; a perforated pot-like basket in said flask and a heating means therefore;

a blade means having a blade inside the basket; blade rotating means comprising an electric motor having means for optionally slowly stirring the contents of said basket or rapidly grinding said contents;

said apparatus further comprising a reservoir for liquids having heating means to produce hot fluids; duct means in said shelf connecting with said reservoir for conveying hot fluids from the reservoir to said basket to effect a brewed liquid seeping into said flask;

said platform having a lever arm means operative to move said flask toward said shelf to a near closure position of said open top relative to said shelf or to effect full closure thereagainst to completely separate the flask interior from the outside atmosphere, thus ensuring that, optionally, a part or all of the aromas and fragrances emerging from the basket and brew remain in the flask until the brew is removed;

blade lifting means for removal of the flask from the platform by lifting the blade means to at least partially release the basket; a cupola in the shelf for receiving at least a portion of said blade means when said blade means is lifted;

said blade means comprising a shaft; said blade lifting means comprising nut and bolt members one of which is carried by said shelf and the other of which is secured to said shaft whereby relative rotation of said members effects lifting of said blade means;

said lever arm means comprising a lever arm and means operated thereby whereby rotation of said lever arm in one direction from a central position lifts said flask and rotation from said central position in the opposite direction lowers said flask to facilitate removal in coaction with said nut and bolt members.

* * * * *